US011237053B2

(12) United States Patent
Houck et al.

(10) Patent No.: US 11,237,053 B2
(45) Date of Patent: Feb. 1, 2022

(54) OPTICAL SENSOR DEVICE

(71) Applicant: VIAVI Solutions Inc., San Jose, CA (US)

(72) Inventors: William D. Houck, Santa Rosa, CA (US); Valton Smith, Novato, CA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 17/117,958

(22) Filed: Dec. 10, 2020

(65) Prior Publication Data

US 2021/0239528 A1 Aug. 5, 2021

Related U.S. Application Data

(60) Provisional application No. 62/969,436, filed on Feb. 3, 2020, provisional application No. 62/969,428, filed on Feb. 3, 2020.

(51) Int. Cl.
*G01J 3/02* (2006.01)
*G01J 3/28* (2006.01)

(52) U.S. Cl.
CPC .............. *G01J 3/28* (2013.01); *G01J 3/0229* (2013.01)

(58) Field of Classification Search
CPC .......... G01J 3/28; G01J 3/0229; G01J 3/0264; G01J 3/027; G01J 2003/1239; G01J 3/2803; G01J 3/2823; H04N 9/04551; H04N 5/2254
See application file for complete search history.

(56) References Cited

U.S. PATENT DOCUMENTS

| | | | |
|---|---|---|---|
| 2005/0243312 A1* | 11/2005 | Geshwind | G01J 3/10 356/310 |
| 2006/0274308 A1 | 12/2006 | Brady et al. | |
| 2018/0052050 A1 | 2/2018 | Menon et al. | |

OTHER PUBLICATIONS

Extended European Search Report for Application No. EP21153986. 1, dated Apr. 21, 2021, 8 pages.
Wagadarikar A., et al., "Single Disperser Design for Coded Aperture Snapshot Spectral Imaging," Applied Optics, Apr. 2008, vol. 47 (10), pp. B44-B51.

* cited by examiner

*Primary Examiner* — Abdullahi Nur
(74) *Attorney, Agent, or Firm* — Harrity & Harrity, LLP

(57) ABSTRACT

An optical sensor device may comprise an optical sensor comprising a set of sensor elements; an optical filter comprising one or more channels, wherein each channel, of the one or more channels, is configured to pass light associated with particular wavelengths to a subset of sensor elements, of the set of sensor elements, of the optical sensor; a phase mask configured to distribute a plurality of light beams associated with a subject in an encoded pattern on an input surface of the optical filter; and one or more processors. The one or more processors may be configured to obtain, from the optical sensor, sensor data associated with the subject and determine, based on the sensor data, spectral information associated with the subject. The one or more processors may determine, based on the sensor data and information associated with the encoded pattern, spatial information associated with the subject.

20 Claims, 8 Drawing Sheets

OPTICAL SENSOR DEVICE

RELATED APPLICATIONS

This application claims priority to U.S. Provisional Patent Application No. 62/969,436, filed on Feb. 3, 2020, and entitled "IMAGING DEVICE," and U.S. Provisional Patent Application No. 62/969,428, filed on Feb. 3, 2020, and entitled "INTEGRATED HYPERSPECTRAL IMAGING OPTICAL COMPONENT," the content of which are incorporated by reference herein in their entirety.

BACKGROUND

An optical sensor device may be utilized to capture information concerning light. For example, the optical sensor device may capture information relating to a set of wavelengths associated with the light. The optical sensor device may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical sensor device includes an optical sensor comprising a set of sensor elements; an optical filter with an angle-dependent wavelength characteristic comprising one or more channels, wherein each channel, of the one or more channels, is configured to pass light associated with particular wavelengths to a subset of sensor elements, of the set of sensor elements, of the optical sensor based on an angle of incidence of the light on the channel; a phase mask configured to distribute a plurality of light beams associated with a subject in an encoded pattern on an input surface of the optical filter; and one or more processors configured to: obtain, from the optical sensor, sensor data associated with the subject; determine, based on the sensor data, spectral information associated with the subject; determine, based on the sensor data and information associated with the encoded pattern, spatial information associated with the subject; and perform one or more actions based on the spectral information and the spatial information.

In some implementations, a non-transitory computer-readable medium storing instructions includes one or more instructions that, when executed by one or more processors of an optical sensor device, cause the one or more processors to: obtain, from an optical sensor of the optical sensor device, sensor data associated with a plurality of light beams that were distributed in an encoded pattern on an input surface of an optical filter of the optical sensor device by a phase mask of the optical sensor device; identify, based on the sensor data, a channel, of one or more channels of the optical filter, that received and passed a light beam; determine, based on information associated with the encoded pattern and identifying the channel, an angle of incidence of the light beam on the channel; determine, based on the angle of incidence of the light beam and angle shift information associated with the channel, a wavelength range associated with the light beam; and provide information identifying the wavelength range associated with the light beam.

In some implementations, a method includes obtaining, by an optical sensor device and from an optical sensor of the optical sensor device, sensor data associated with a plurality of light beams that were distributed in an encoded pattern on an input surface of an optical filter of the optical sensor device by a phase mask of the optical sensor device; identifying, by the optical sensor device and based on the sensor data, a channel, of one or more channels of the optical filter, that received and passed a light beam; identifying, by the optical sensor device and based on the sensor data, a sensor element of the optical sensor that received the light beam; determining, by the optical sensor device and based on information associated with the encoded pattern and identifying the channel and the sensor element, an angle of incidence of the light beam on the channel; determining, by the optical sensor device and based on the angle of incidence of the light beam and angle shift information associated with the channel, a wavelength range associated with the light beam; and providing, by the optical sensor device, information identifying the wavelength range associated with the light beam.

DETAILED DESCRIPTION

Figure 1A:
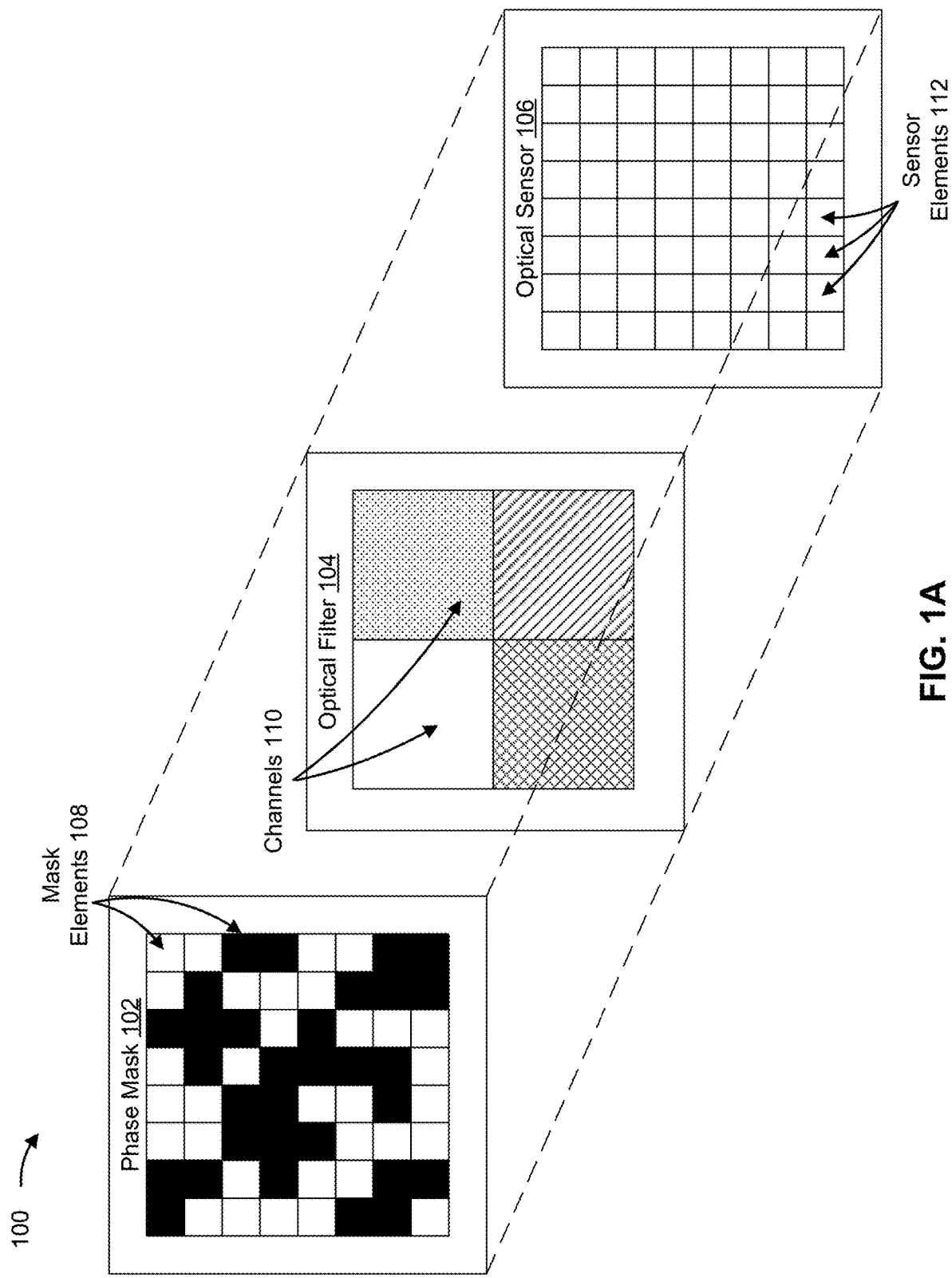
FIGS. 1A-1B are diagrams of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A conventional optical sensor device, such as a spectrometer, may be configured to determine spectral information associated with light (e.g., ambient light) captured by the optical sensor device. The light may enter the optical sensor device and may be received by an optical filter and an optical sensor of the optical sensor device (e.g., wherein the optical filter is disposed on the optical sensor). The optical filter may include a set of optical channels designed to respectively pass light in different wavelength ranges to a set of sensor elements of the optical sensor. This allows the optical sensor to determine spectral information associated with the light that relates to the different wavelength ranges. However, the optical sensor is only able to determine spectral information associated with individual wavelength ranges respectively associated with the set of optical channels. Further, the conventional optical device is not able to determine spatial information associated with the light (e.g., relating to a location or placement of a subject associated with origination of the light).

Some implementations described herein provide an optical sensor device that includes a phase mask, an optical filter, an optical sensor, and one or more processors. The phase mask may be configured to distribute a plurality of light beams associated with a subject in an encoded pattern on an input surface of the optical filter. The optical mask may include one or more channels, where each channel is configured to have an "angle shift" such that each channel is designed to pass light in multiple different wavelength ranges based on angle of incidence of the light on the channel. For example, a channel may pass a light beam associated with a first wavelength range when the light beam falls incident on the channel within a first incident angle range, the channel may pass a light beam associated with a second wavelength range when the light beam falls incident on the channel within a second incident angle range, and so on.

In some implementations, the one or more processors may obtain, from the optical sensor, sensor data associated with the plurality of light beams, and may identify, based on the sensor data, a channel, of the one or more channels of the optical filter, that received and passed a light beam and/or a sensor element of the optical sensor that received the light beam. The one or more processors may determine, based on information associated with the encoded pattern (e.g., information associated with decoding the encoded pattern) and information identifying the channel and/or the sensor element, an angle of incidence of the light beam on the channel. The one or more processors may determine, based on the angle of incidence of the light beam on the channel and angle shift information associated with the channel, a wavelength range associated with the light beam. In this way, the one or more processors may be able to identify multiple wavelength ranges associated with light beams that are passed by the channel of the optical filter and received by sensor elements of the optical sensor. Accordingly, the one or more processors increase the optical sensor device's ability to determine accurate spectral information associated with light that enters the optical sensor device, as compared to a conventional optical sensor device. Moreover, the one or more processors increase a precision of the spectral information over a wider set of wavelength ranges as compared to a conventional optical sensor device.

In some implementations, the one or more processors may determine an angle of incidence of an additional light beam on an additional channel of the optical filter in a similar manner to that described above. The one or more processors may determine, based on the angle of incidence of the light beam on the channel and the angle of incidence of the additional light beam on the additional channel, a distance of the subject from the optical device (e.g., from the phase mask, the optical filter, or the optical sensor of the optical device). In this way, the one or more processors enable the optical sensor device to determine spatial information that is not possible to determine using a conventional optical sensor device that utilizes a single optical filter and a single optical sensor.

In some implementations, the phase mask may be disposed on a first surface of a substrate and the optical filter may disposed on a second surface (e.g., an opposite surface) of the substrate to form a combined optical element. The substrate may have a particular thickness to cause the phase mask to distribute a plurality of light beams in an encoded pattern across the input surface of the optical filter (e.g., across a threshold percentage of the input surface of the optical filter, such as 95%, 98%, 99%, or 99.5% of the input surface of the optical filter). The combined optical element may be disposed over the optical sensor to form the optical sensor device. In this way, the combined optical element may be used instead of a single phase mask and a single optical filter that are formed on respective substrates. Accordingly, the substrate of the combined optical element may have a thickness that is smaller than a total thickness of the substrate of the single phase mask and the substrate of the single optical filter. This allows the optical sensor device to have a smaller form factor (e.g., a thickness on the order of millimeters) when using the combined optical element as compared to using the single phase mask and the single optical filter.

Figure 1B:
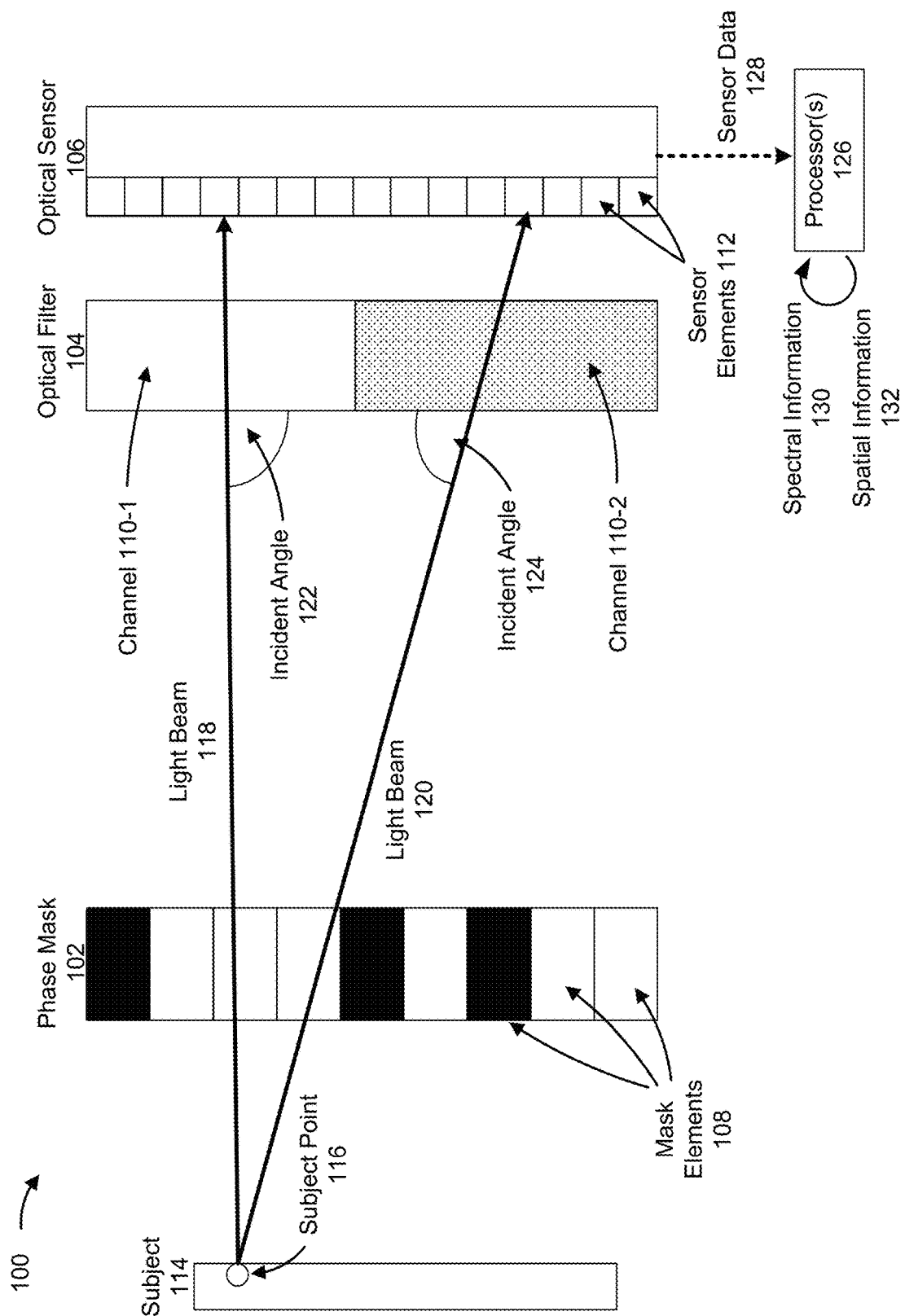

FIGS. 1A and 1B are diagrams of an overview of an example implementation 100 described herein. As shown in FIG. 1A, example implementation 100 includes a phase mask 102, an optical filter 104, and an optical sensor 106. The phase mask 102, the optical filter 104, and the optical sensor 106 may be associated with an optical sensor device, which is described in more detail elsewhere herein.

As further shown in FIG. 1A, the phase mask 102 may include one or more mask elements 108. The one or more mask elements 108 may each be transparent or opaque (e.g., reflective, absorbing, and/or the like) and arranged in a pattern (e.g., a non-uniform pattern). For example, as shown in FIG. 1A, transparent mask elements 108 are shown as white squares and opaque mask elements 108 are shown as black squares, and the transparent mask elements 108 and the opaque mask elements 108 are arranged in a grid pattern. The phase mask 102 may be configured to distribute a plurality of light beams that pass through the phase mask 102 in an encoded pattern on an input surface of the optical filter 104. In some implementations, the phase mask 102 may be a coded aperture or another element that produces an encoded pattern of light beams, such as a Fresnel zone plate, an optimized random pattern array, a uniformly redundant array, a hexagonal uniformly redundant array, or a modified uniformly redundant array, among other examples.

The encoded pattern may indicate angular direction information associated with an origin plane (e.g., that is associated with a subject 114 described herein in relation to FIG. 1B) of the plurality of light beams that are passed by the phase mask 102. In some implementations, the one or more mask elements 108 may be arranged in a pattern that is associated with an algorithm (e.g., a computational encoding algorithm) to cause the phase mask 102 to pass the plurality of light beams and to distribute the plurality of light beams in the encoded pattern on the input surface of the optical filter 104.

As further shown in FIG. 1A, the optical filter 104 may include one or more channels 110 that respectively pass light in different wavelength ranges to sensor elements 112 of the optical sensor 106. For example, as shown in FIG. 1A, a first channel 110 (e.g., indicated by no shading and no patterning) may pass light associated with a first wavelength range to a first set of sensor elements 112 (e.g., that comprises one or more sensor elements 112) of the optical sensor 106, a second channel 110 (e.g., indicated by gray shading) may pass light associated with a second wavelength range to a second set of sensor elements 112 of the optical sensor 106, a third channel 110 (e.g., indicated by diamond patterning) may pass light associated with a third wavelength range to a third set of sensor elements 112 of the optical sensor 106, and so on. In some implementations, the optical filter 104 may have an angle-dependent wavelength characteristic. For example, a channel 110 may be configured to have "angle shift," such that the channel 110 may pass light associated with a first wavelength range when the light falls incident on the channel 110 within a first incident angle range, may pass light associated with a second wavelength range when the light falls incident on the channel 110 within a second incident angle range, may pass light associated with a third wavelength range when the light falls incident on the channel 110 within a third incident angle range, and so on. The channel 110 may be configured to pass light associated with shorter wavelengths as the light falls on the channel 110 at greater incident angles.

In some implementations, the optical filter 104 may include an optical interference filter. The optical interference filter may have an angle dependent wavelength characteristic, and the angle dependent wavelength characteristic may be represented by the following equation:

$$\lambda_\theta = \lambda_0 \left[1 - \frac{n_0}{n_e} \sin^2\theta\right]^{1/2},$$

where $\lambda_\theta$ represents a peak wavelength at incident angle $\theta$, $\lambda_0$ represents a peak wavelength at incident angle 0, $n_0$ represents a refractive index of the incident medium, $n_e$ represents an effective index of the optical interference filter, and $\theta$ is the incident angle of a light beam. Additionally, or alternatively, the optical filter 104 may include, for example, a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, and/or glasses, among other examples), and/or the like.

As further shown in FIG. 1A, the optical sensor 106 may include one or more sensor elements 112 (e.g., an array of sensor elements, also referred to herein as a sensor array), each configured to obtain information. For example, a sensor element 112 may provide an indication of intensity of light that is incident on the sensor element 112 (e.g., active/inactive or a more granular indication of intensity). The optical sensor 106 may be configured to collect the information obtained by the one or more sensor elements 112 to generate sensor data.

Turning to FIG. 1B, the optical sensor device associated with the phase mask 102, the optical filter 104, and the optical sensor 106 may be configured to capture information relating to a subject 114. In some implementations, one or more light beams may originate at a subject point 116 of the subject 114 (e.g., emit from the subject point 116 or reflect from the subject point 116) and may be received by the optical sensor device. For example, as shown in FIG. 1B, a light beam 118 and a light beam 120 may originate at the subject point 116 and may each pass through the phase mask 102 and the optical filter 104 and may each be received by the optical sensor 106. The phase mask 102 may distribute the light beam 118 and the light beam 120 in an encoded pattern on the input surface of the optical filter 104. Accordingly, the phase mask 102 may cause the light beam 118 to fall incident on the input surface of the optical filter 104 at an incident angle 122 and the light beam 120 to fall incident on the input surface of the optical filter 104 at an incident angle 124. The light beam 118 may be received by a channel 110-1 of the optical filter 104 and the channel 110-1 may pass the light beam 118 (e.g., when the light beam 118 is associated with a wavelength that the channel 110-1 is configured to pass) to a corresponding sensor element 112 of the optical sensor 106 (e.g., a sensor element 112 configured to receive light beams passed by the channel 110-1). The light beam 120 may be received by a channel 110-2 of the optical filter 104 and the channel 110-2 may pass the light beam 120 (e.g., when the light beam 120 is associated with a wavelength that the channel 110-2 is configured to pass) to a corresponding sensor element 112 of the optical sensor 106 (e.g., a sensor element 112 configured to receive light beams passed by the channel 110-2).

As further shown in FIG. 1B, the optical sensor device may be associated with one or more processors 126 and may provide, as shown by reference number 128, sensor data to the one or more processors 126. The sensor data may indicate information relating to the light beams originating at the subject 114 and/or the subject point 116, such as an indication of intensity of the light beams that are received by the one or more sensor elements 112.

As further shown in FIG. 1B, and by reference number 130, the one or more processors 126 may process the sensor data to determine spectral information associated with the subject 112 and/or the subject point 116. For example, the one or more processors 126 may identify, based on the sensor data, a particular sensor element 112 of the optical sensor 106 that received a light beam. The one or more processors 126 may determine, based on information associated with the optical filter 104 (e.g., that is stored in a data structure that is accessible by the one or more processors 126), that the particular sensor element 112 is associated with a particular channel 110 of the optical filter 104 (e.g., the particular sensor element 112 is configured to receive light beams passed by the particular channel 110) and may identify the particular channel 110 as having received and passed the light beam to the particular sensor element 112. Accordingly, the one or more processors 126 may determine that the light beam is associated with a wavelength range that the particular channel 110 is configured to pass.

In some implementations, the one or more processors 126 may determine, based on information associated with the encoded pattern (e.g., that is stored in the same data structure described above or a different data structure that is accessible by the one or more processors 126), an angle of incidence of the light beam on the particular channel 110. The information associated with the encoded pattern may include information for determining the angle of incidence of the particular light beam on the particular channel 110. For example, the information associated with the encoded pattern may identify at least one algorithm, such as a computational encoding algorithm that causes the phase mask 102 to distribute the plurality of light beams in the encoded pattern on the input surface of the optical filter 104 and/or an algorithm for reconstructing an image from the encoded pattern, among other examples. The one or more processors 126 may process information identifying the particular channel 110 using the at least one algorithm to determine the angle of incidence of the light beam on the particular channel 110. Additionally, or alternatively, the one or more processors 126 may process information identifying the particular channel 110 and the particular sensor element 112 using the at least one algorithm to determine the angle of incidence of the light beam on the particular channel 110. Because the information identifying the particular channel 110 and the particular sensor element 112 may indicate a particular location of where the light beam fell incident on the particular channel 110, the determination of the angle of incidence of the light beam by the one or more processors 126 may be more accurate and/or more precise when using the information identifying the particular channel 110 and the particular sensor element 112 as compared to using the information identifying the particular channel 110.

In some implementations, the one or more processors 126 may determine, based on the angle of incidence of the light beam on the particular channel 110 and angle shift information associated with the particular channel 110 (e.g., that is stored in one or more of the data structures described above or a different data structure that is accessible by the one or more processors 126), a wavelength range associated with the light beam. For example, the angle shift information associated with the particular channel 110 may indicate a first wavelength range for light beams that are received and passed by the particular channel 110 and that fall incident on the particular channel at angles that satisfy (e.g., that are less than or equal to) a first incident angle threshold, a second wavelength range for light beams that are received and passed by the particular channel 110 and that fall incident on the particular channel 110 at angles that do not satisfy (e.g., are greater than) the first incident angle threshold and/or that satisfy (e.g., that are less than or equal to) a second incident angle threshold, a third wavelength range for light beams that are received and passed by the particular channel 110 and that fall incident on the particular channel 110 at angles that do not satisfy (e.g., are greater than) the second incident angle threshold and/or that satisfy (e.g., that are less than or equal to) a third incident angle threshold, and so on. Accordingly, the one or more processors 126 may determine that the light beam is associated with the first wavelength range when the angle of incidence of the light beam satisfies the first incidence angle threshold, the second wavelength range when the angle of incidence of the light beam does not satisfy the first incidence angle threshold and/or satisfies the second incidence angle threshold, and/or the third wavelength range when the angle of incidence of the light beam does not satisfy the second incidence angle threshold and/or satisfies the third incidence angle threshold, among other examples.

As further shown in FIG. 1B, and by reference number 132, the one or more processors 126 may process the sensor data to determine spatial information associated with the subject 112 and/or the subject point 116. For example, the one or more processors 126 may identify, based on the sensor data, a first sensor element 112 of the optical sensor 106 that received a first light beam (e.g., that originated at the subject point 116) and a second sensor element 112 of the optical sensor 106 that received a second light beam (e.g., that originated at the subject point 116). The one or more processors 126 may determine, based on the information associated with the optical filter 104, that the first sensor element 112 is associated with a first channel 110 of the optical filter 104 and that the second sensor element 112 is associated with a second channel 110 of the optical filter 104. Accordingly, the one or more processors 126 may identify the first channel 110 as having received and passed the first light beam to the first sensor element 112 and the second channel 110 as having received and passed the second light beam to the second sensor element 112.

In some implementations, the one or more processors 126 may determine, based on the information associated with the encoded pattern (e.g., as described above), an angle of incidence of the first light beam on the first channel 110 and an angle of incidence of the second light beam on the second channel 110 (e.g., in a similar manner to that described above). For example, the one or more processors 126 may process, using the at least one algorithm identified by the information associated with the encoded pattern, information identifying the first channel 110 and/or information identifying the first sensor element 112 to determine the angle of incidence of the first light beam on the first channel 110. The one or more processors 126 may also process, using the at least one algorithm, information identifying the second channel 110 and/or information identifying the second sensor element 112 using the at least one algorithm to determine the angle of incidence of the second light beam on the second channel 110.

In some implementations, the one or more processors 126 may determine, based on the angle of incidence of the first light beam on the first channel 110 and the angle of incidence of the second light beam on the second channel 110, a distance of the subject point 116 from the phase mask 102, the optical filter 104, and/or the optical sensor 106. For example, the one or more processors 126 may use a computer vision technique (e.g., a triangulation computation technique, a stereo vision technique, and/or the like) based on information indicating a location of the first channel 110 and the angle of incidence of the first light beam on the first channel 110 and information indicating a location of the second channel 110 and the angle of incidence of the second light beam on the second channel 110 to determine a distance to the subject point 116.

In some implementations, the one or more processors 126 may provide the spectral information (e.g., that identifies a wavelength range associated with one or more light beams) and/or the spatial information (e.g., that identifies a distance of the subject point 116 from the phase mask 102, the optical filter 104, and/or the optical sensor 106) to another device, such as a user device. For example, the one or more processors 126 may send the spectral information and/or the spatial information to the user device to cause the user device to display the spectral information and/or the spatial information on a display of the user device. As another example, the one or more processors 126 may send the spectral information and/or the spatial information to the user device to cause the user device to determine one or more characteristics of the subject 114 (e.g., a material composition of the subject 114, a temperature of the subject 114, a location of the subject 114, a trajectory of the subject 114, and/or the like).

In this way, the optical sensor device associated with the phase mask 102, the optical filter 104, the optical sensor 106, and the one or more processors 126 is able to determine more accurate spectral information associated with light that enters the optical sensor device, as compared to a conventional optical sensor device. Moreover, the optical sensor device provides greater spectral precision over a wider set of wavelength ranges, as compared to a conventional optical sensor device. Further, the optical sensor device is able to determine spatial information relating to a subject that is associated with the light that enters the optical sensor device, which is not possible using a conventional optical sensor device.

As indicated above, FIGS. 1A and 1B are provided merely as one or more examples. Other examples may differ from what is described with regard to FIGS. 1A and 1B.

Figure 2:
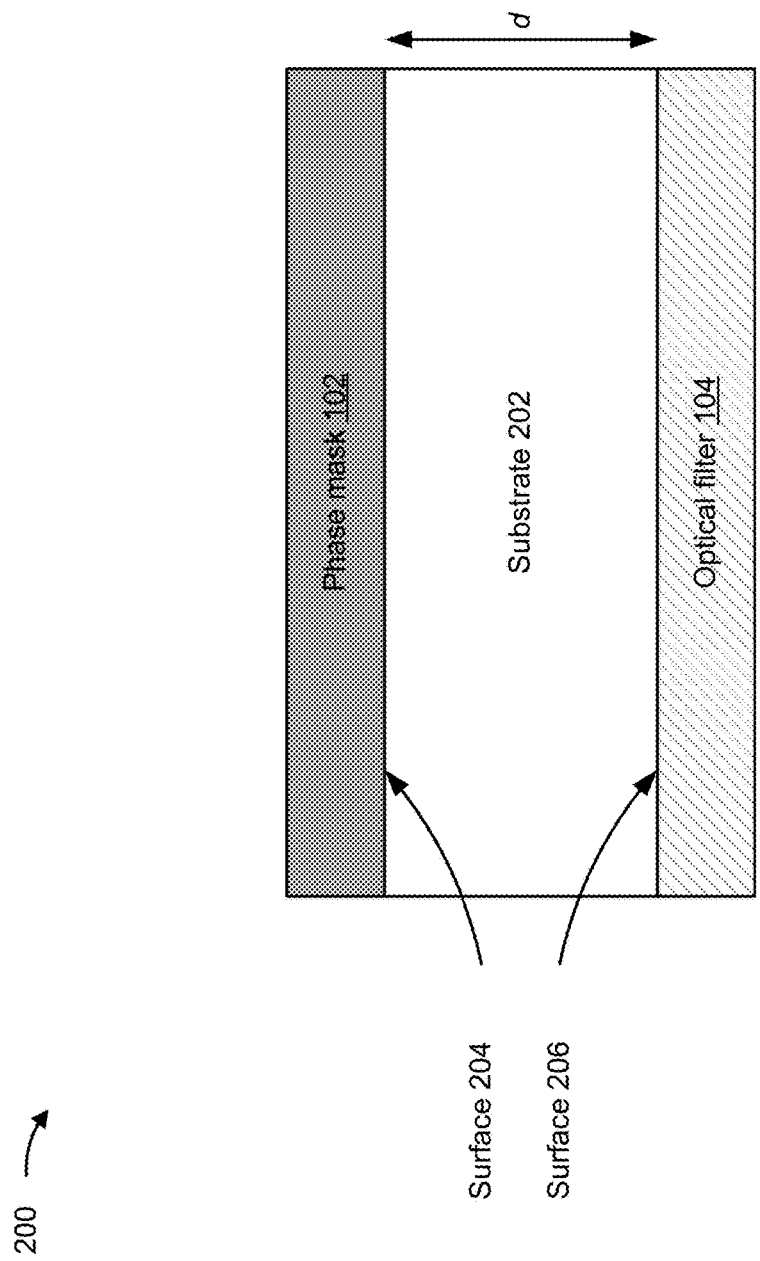
FIG. 2 is a diagram of a combined optical element described herein.

FIG. 2 is a diagram of a combined optical element 200 described herein. As shown in FIG. 2, the phase mask 102 and the optical filter 104 may be disposed on a substrate 202 to form the combined optical element 200. The phase mask 102 may be formed on a surface 204 of the substrate 202 and the optical filter 104 may be formed on a surface 206 of the substrate 202. Accordingly, the substrate 202 may have a thickness d that is also a distance between the phase mask 102 and the optical filter 104. The thickness d may be configured to cause the phase mask 102 to distribute a plurality of light beams in an encoded pattern (e.g., as described above in relation to FIGS. 1A and 1B) across the input surface of the optical filter 104 (e.g., across a threshold percentage of the input surface of the optical filter 104, such as 95%, 98%, 99%, or 99.5% of the input surface of the optical filter 104). In some implementations, the combined optical element 200 may be disposed over the optical sensor 106 (e.g., rather than having a separate phase mask 102 and separate optical filter disposed over the optical sensor 106).

In this way, the combined optical element 200 may be included in the optical sensor device disclosed herein instead of a single phase mask 102 and a single optical filter 104 that are formed on respective substrates. Accordingly, the substrate of the combined optical element 200 may have a thickness d that is smaller than a total thickness of the substrate of the single phase mask 102 and the substrate of the single optical filter 104. This allows the optical sensor device to have a smaller form factor when using the combined optical element 200 as compared to using the single phase mask 102 and the single optical filter 104.

Figure 3:
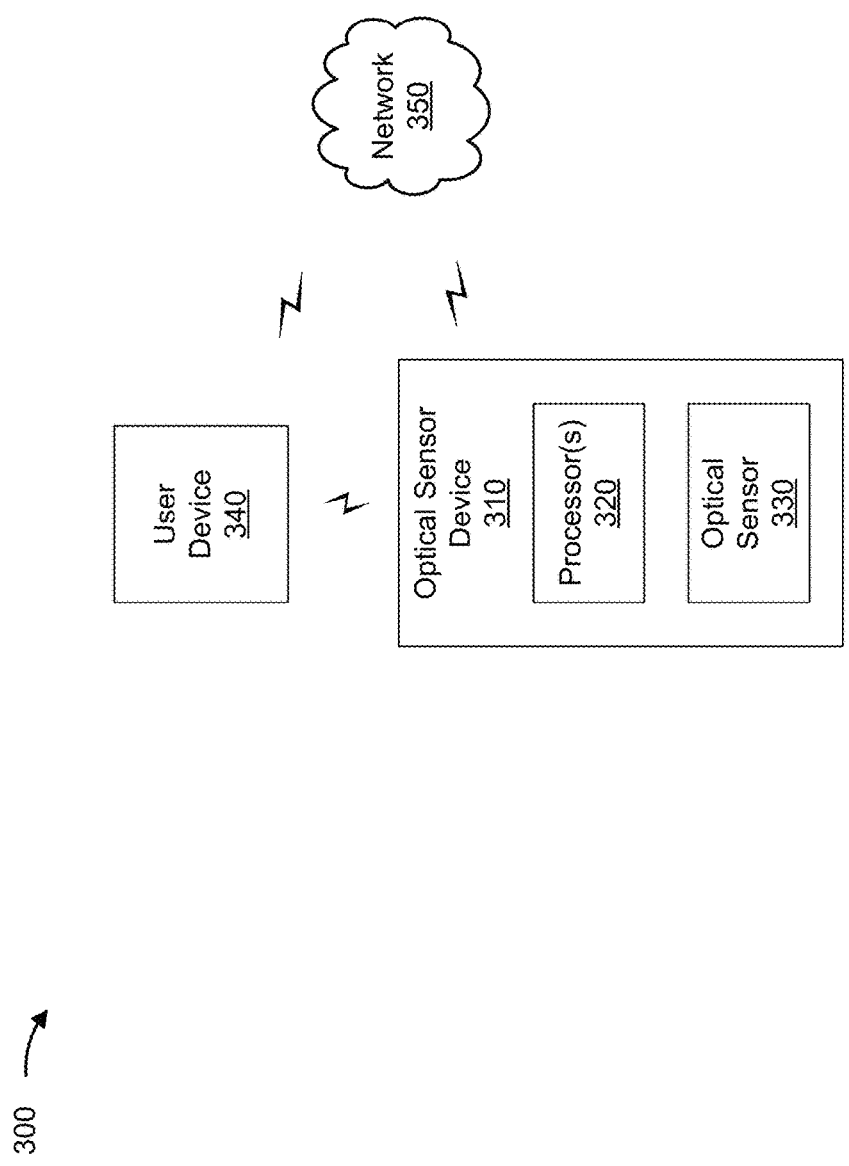
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an optical sensor device 310 that may include one or more processors 320 (e.g., that correspond to the one or more processors 126 described herein in relation to FIGS. 1A and 1B) and an optical sensor 330 (e.g., that corresponds to the optical sensor 106 described herein in relation to FIGS. 1A and 1B). The environment 300 may also include a user device 340 and a network 350. Devices of environment 300 may interconnect via wired connections, wireless connections, or a combination of wired and wireless connections.

Optical sensor device 310 may include an optical device capable of storing, processing, and/or routing spectral information and/or spatial information associated with a subject. For example, optical sensor device 310 may include a spectrometer device that performs spectroscopy, such as a spectral optical sensor device (e.g., a binary multispectral optical sensor device that performs vibrational spectroscopy, such as a near infrared (NIR) spectrometer, a mid-infrared spectroscopy (mid-IR), Raman spectroscopy, and/or the like). For example, optical sensor device 310 may perform a health parameter monitoring determination, a pulse transit time determination, a biometric authentication determination, a liveness detection determination, and/or the like. In this case, optical sensor device 310 may utilize the same wavelengths, different wavelengths, a combination of the same wavelengths and different wavelengths, and/or the like for such determinations. In some implementations, optical sensor device 310 may be incorporated into user device 340, such as a wearable spectrometer and/or the like. In some implementations, optical sensor device 310 may receive information from and/or transmit information to another device in environment 300, such as user device 340.

In some implementations, optical sensor device 310 may comprise a spectral imaging camera. A spectral imaging camera is a device that can capture an image of a scene. A spectral imaging camera (or a processor 320 associated with the spectral imaging camera) may be capable of determining spectral content or changes in spectral content at different points in an image of a scene, such as any point in an image of a scene.

In some implementations, optical sensor device 310 may comprise a spectral imaging camera capable of performing hyperspectral imaging. For example, optical sensor device 310 may include an optical filter (e.g., optical filter 104, described herein in relation to FIGS. 1A and 1B). In some implementations, the optical filter may be disposed on optical sensor 330. In some implementations, optical sensor device 310 may comprise a phase mask (e.g., phase mask 102, described herein in relation to FIGS. 1A and 1B). For example, the phase mask may be configured to distribute light in an encoded pattern across an input surface of the optical filter when the light is en route to optical sensor 330. Each point in an image captured by optical sensor device 310 may be encoded with spatio-spectral information by the phase mask. In some implementations, a combined optical element (e.g., the combined optical element 200 described herein in relation to FIG. 2) that comprises a photomask and an optical filter on opposite sides of a substrate may be disposed on the optical sensor 330 (e.g., instead of an individual phase mask and individual optical filter)

Optical sensor device 310 may include one or more processors 320, described in more detail in connection with FIG. 4.

Optical sensor device 310 may include an optical sensor 330. Optical sensor 330 includes a device capable of sensing light. For example, optical sensor 330 may include an image sensor, a multispectral sensor, a spectral sensor, and/or the like. In some implementations, optical sensor 330 may include a charge-coupled device (CCD) sensor, a complementary metal-oxide semiconductor (CMOS) sensor, and/or the like. In some implementations, optical sensor 330 may include a front-side illumination (FSI) sensor, a back-side illumination (BSI) sensor, and/or the like. In some implementations, optical sensor 330 may be included in a camera of optical sensor device 310 and/or user device 340.

User device 340 includes one or more devices capable of receiving, generating, storing, processing, and/or providing the spectral information and/or the spatial information associated with the subject. For example, user device 340 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, user device 340 may receive information from and/or transmit information to another device in environment 300, such as optical sensor device 310.

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. For example, although optical sensor device 310 and user device 340 are described as separate devices, optical sensor device 310 and user device 340 may be implemented as a single device. Additionally, or alternatively, a set of devices (e.g., one or more devices) of environment 300 may perform one or more functions described as being performed by another set of devices of environment 300.

Figure 4:
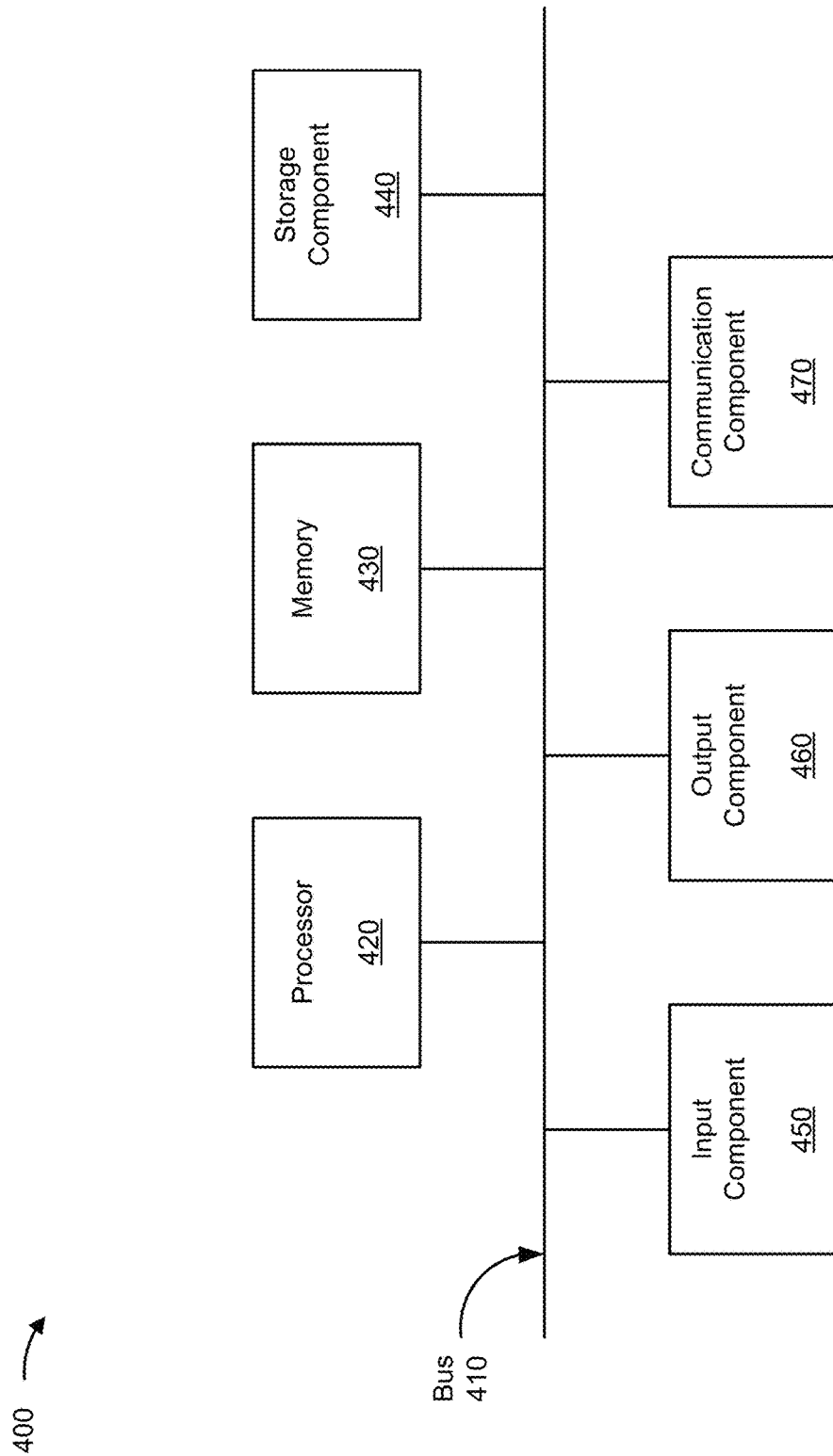
FIG. 4 is a diagram of example components of one or more devices of FIG. 2.

FIG. 4 is a diagram of example components of a device 400. Device 400 may correspond to optical sensor device 310 and/or user device 340. In some implementations, optical sensor device 310 and/or user device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication component 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication component 470 may permit device 400 to receive information from another device and/or provide information to another device. For example, communication component 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication component 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
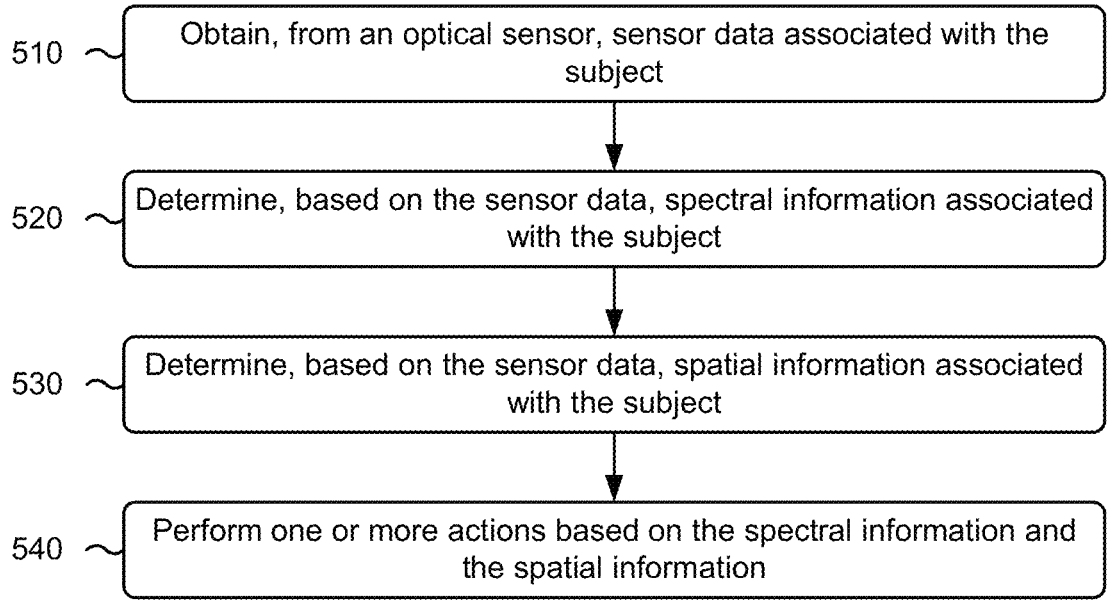
FIGS. 5-7 are flowcharts of example processes relating to an optical sensor device.

FIG. 5 is a flowchart of an example process 500 associated with an optical sensor device (e.g., optical sensor device 310). In some implementations, one or more process blocks of FIG. 5 may be performed by one or more processors (e.g., one or more processors 126 or one or more processors 320) of the optical sensor device. In some implementations, one or more process blocks of FIG. 5 may be performed by another device or a group of devices separate from or including the one or more processors, such as a user device (e.g., user device 340). Additionally, or alternatively, one or more process blocks of FIG. 5 may be performed by one or more components of device 400, such as processor 420, memory 430, storage component 440, input component 450, output component 460, and/or communication component 470.

In some implementations, the optical sensor device may include, in addition to the one or more processors, an optical sensor comprising a set of sensor elements; an optical filter with an angle-dependent wavelength characteristic comprising one or more channels, wherein each channel, of the one or more channels, is configured to pass light associated with particular wavelengths to a subset of sensor elements, of the set of sensor elements, of the optical sensor based on an angle of incidence of the light on the channel; and a phase mask configured to distribute a plurality of light beams associated with a subject in an encoded pattern on an input surface of the optical filter. In some implementations, the phase mask is disposed on a first surface of a substrate and the optical filter is disposed on a second surface of the substrate to form a combined optical element, wherein the combined optical element is disposed over the optical sensor. Additionally, or alternatively, a thickness of the substrate is configured to cause the phase mask to distribute the plurality of light beams in the encoded pattern across the input surface of the optical filter.

As shown in FIG. 5, process 500 may include obtaining, from the optical sensor, sensor data associated with the subject (block 510). For example, the one or more processors may obtain, from the optical sensor, sensor data associated with the subject, as described above.

As further shown in FIG. 5, process 500 may include determining, based on the sensor data, spectral information associated with the subject (block 520). For example, the one or more processors may determine, based on the sensor data, spectral information associated with the subject, as described above.

As further shown in FIG. 5, process 500 may include determining, based on the sensor data, spatial information associated with the subject (block 530). For example, the one or more processors may determine, based on the sensor data, spatial information associated with the subject, as described above. In some implementations, the one or more processors may determine the spatial information based on the sensor data and information associated with the encoded pattern.

As further shown in FIG. 5, process 500 may include performing one or more actions based on the spectral information and the spatial information (block 540). For example, the one or more processors may perform one or more actions based on the spectral information and the spatial information, as described above.

Process 500 may include additional implementations, such as any single implementation or any combination of implementations described below and/or in connection with one or more other processes described elsewhere herein.

In a first implementation, the information associated with the encoded pattern includes, for a light beam, of the plurality of light beams, that is distributed by the phase mask in the encoded pattern, information for determining, when the light beam falls incident on a particular channel, of the one or more channels, of the optical filter, an angle of incidence of the light beam on the particular channel.

In a second implementation, determining the spatial information includes identifying, based on the sensor data, a first channel, of the one or more channels, of the optical filter that received and passed a first light beam associated with a point of the subject; identifying, based on the sensor data, a second channel, of the one or more channels, of the optical filter that received and passed a second light beam associated with the point of the subject; determining, based on the information associated with the encoded pattern and identifying the first channel, an angle of incidence of the first light beam on the first channel; determining, based on the information associated with the encoded pattern and identifying the second channel, an angle of incidence of the second light beam on the second channel; and determining, based on the angle of incidence of the first light beam and the angle of incidence of the second light beam, a distance of the point of the subject from the optical sensor device.

In a third implementation, determining the spatial information includes identifying, based on the sensor data, a first channel, of the one or more channels, of the optical filter that received and passed a first light beam associated with a point of the subject, and a first sensor element, of a first subset of sensor elements that corresponds to the first channel, of the optical sensor that received the first light beam; identifying, based on the sensor data, a second channel, of the one or more channels, of the optical filter that received and passed a second light beam associated with the point of the subject, and a second sensor element, of a second subset of sensor elements that corresponds to the second channel, of the optical sensor that received the second light beam; determining, based on the information associated with the encoded pattern and identifying the first channel and the first sensor element, an angle of incidence of the first light beam on the first channel; determining, based on the information associated with the encoded pattern and identifying the second channel and the second sensor element, an angle of incidence of the second light beam on the second channel; and determining, based on the angle of incidence of the first light beam and the angle of incidence of the second light beam, a distance of the point of the subject from the optical sensor device.

In a fourth implementation, determining the spectral information includes identifying, based on the sensor data, a particular channel, of the one or more channels, of the optical filter that received and passed a light beam associated with a point of the subject; determining, based on the information associated with the encoded pattern and identifying the particular channel, an angle of incidence of the light beam on the particular channel; and determining, based on the angle of incidence of the light beam and angle shift information associated with the particular channel, a wavelength range associated with the light beam.

In a fifth implementation, the angle shift information associated with the particular channel indicates a first wavelength range for light beams that are received and passed by the particular channel and that fall incident on the particular channel at angles that satisfy an incident angle threshold, and a second wavelength range for light beams that are received and passed by the particular channel and that fall incident on the particular channel at angles that do not satisfy the incident angle threshold.

In an sixth implementation, determining the spectral information includes identifying, based on the sensor data, a particular channel, of the one or more channels, of the optical filter that received and passed a light beam associated with a point of the subject, and a particular sensor element, of a particular subset of sensor elements that corresponds to the particular channel, of the optical sensor that received the light beam; determining, based on the information associated with the encoded pattern and identifying the particular channel and the particular sensor element, an angle of incidence of the light beam on the particular channel; and determining, based on the angle of incidence of the light beam and angle shift information associated with the particular channel, a wavelength range associated with the light beam.

In a seventh implementation, performing the one or more actions includes causing display of the spectral information and the spatial information on a display of another device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
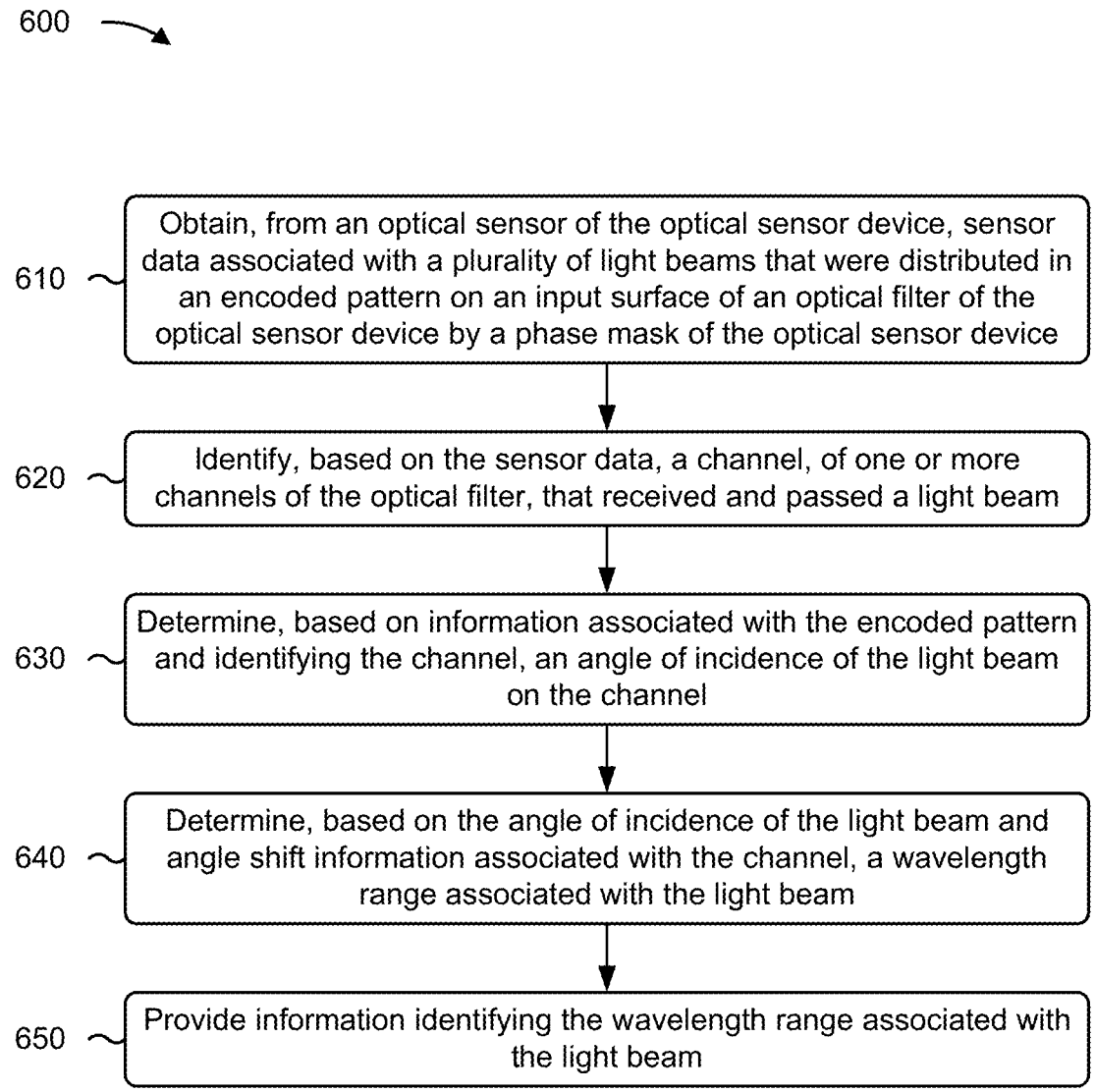

FIG. 6 is a flowchart of an example process 600 associated with an optical sensor device (e.g., optical sensor device 310). In some implementations, one or more process blocks of FIG. 6 may be performed by one or more processors (e.g., one or more processors 126 or one or more processors 320) of the optical sensor device. In some implementations, one or more process blocks of FIG. 6 may be performed by another device or a group of devices separate from or including the one or more processors, such as a user device (e.g., user device 340). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include obtaining, from an optical sensor of the optical sensor device, sensor data associated with a plurality of light beams that were distributed in an encoded pattern on an input surface of an optical filter of the optical sensor device by a phase mask of the optical sensor device (block 610). For example, the one or more processors may obtain, from an optical sensor of the optical sensor device, sensor data associated with a plurality of light beams that were distributed in an encoded pattern on an input surface of an optical filter of the optical sensor device by a phase mask of the optical sensor device, as described above.

As further shown in FIG. 6, process 600 may include identifying, based on the sensor data, a channel, of one or more channels of the optical filter, that received and passed a light beam (block 620). For example, the one or more processors may identify, based on the sensor data, a channel, of one or more channels of the optical filter, that received and passed a light beam, as described above.

As further shown in FIG. 6, process 600 may include determining, based on information associated with the encoded pattern and identifying the channel, an angle of incidence of the light beam on the channel (block 630). For example, the one or more processors may determine, based on information associated with the encoded pattern and identifying the channel, an angle of incidence of the light beam on the channel, as described above.

As further shown in FIG. 6, process 600 may include determining, based on the angle of incidence of the light beam and angle shift information associated with the channel, a wavelength range associated with the light beam (block 640). For example, the one or more processors may determine, based on the angle of incidence of the light beam and angle shift information associated with the channel, a wavelength range associated with the light beam, as described above.

As further shown in FIG. 6, process 600 may include providing information identifying the wavelength range associated with the light beam (block 650). For example, the one or more processors may provide information identifying the wavelength range associated with the light beam, as described above.

Process 600 may include additional implementations, such as any single implementation or any combination of implementations described below and/or in connection with one or more other processes described elsewhere herein.

In a first implementation, providing the information identifying the wavelength range associated with the light beam includes sending the information identifying the wavelength range associated with the light beam to another device to cause the other device to determine one or more characteristics of a subject associated with the light beam.

In a second implementation, the light beam is associated with a point of a subject, and process 600 includes identifying, based on the sensor data, an additional channel, of the one or more channels, of the optical filter that received and passed an additional light beam associated with the point of the subject; determining, based on the information associated with the encoded pattern and identifying the additional channel, an angle of incidence of the additional light beam on the additional channel; determining, based on the angle of incidence of the light beam and the angle of incidence of the additional light beam, a distance of the point of the subject from the optical sensor device; and providing information identifying the distance of the point of the subject from the optical sensor device.

In a third implementation, determining the angle of incidence of the light beam on the channel includes identifying, based on the information associated with the encoded pattern, an algorithm for reconstructing an image from the encoded pattern, and determining, using the algorithm and based on information identifying the channel, the angle of incidence of the light beam.

In a fourth implementation, the angle shift information associated with the channel indicates a first wavelength range for light beams that are received and passed by the channel and that fall incident on the channel at angles that satisfy an incident angle threshold, and a second wavelength range for light beams that are received and passed by the channel and that fall incident on the channel at angles that do not satisfy the incident angle threshold.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
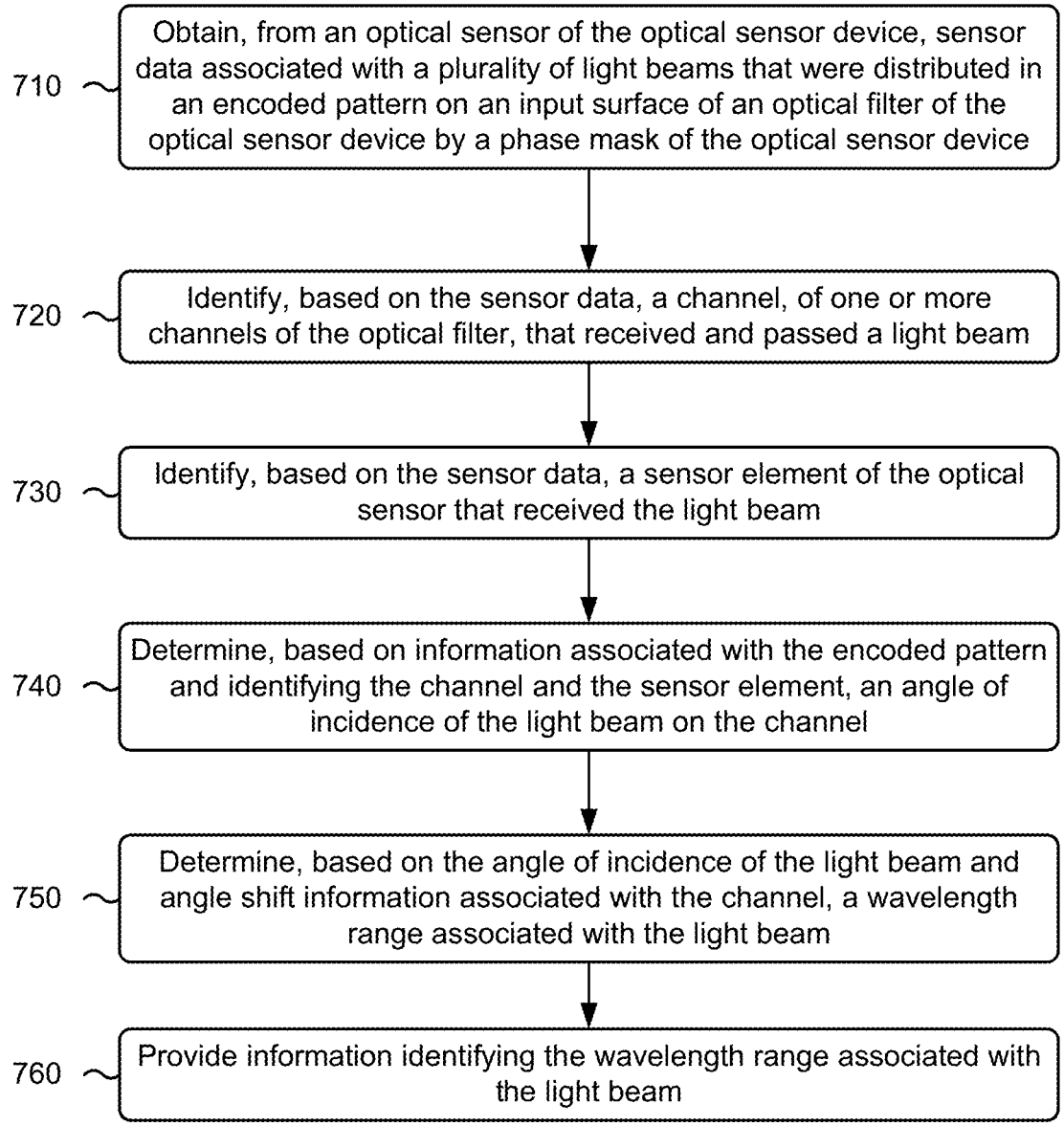

FIG. 7 is a flowchart of an example process 700 associated with an optical sensor device (e.g., optical sensor device 310). In some implementations, one or more process blocks of FIG. 7 may be performed by the optical sensor device. In some implementations, one or more process blocks of FIG. 7 may be performed by another device or a group of devices separate from or including the one or more processors, such as a user device (e.g., user device 340). Additionally, or alternatively, one or more process blocks of FIG. 7 may be performed by one or more components of device 400, such as processor 420, memory 430, storage component 440, input component 450, output component 460, and/or communication component 470.

As shown in FIG. 7, process 700 may include obtaining, from an optical sensor of the optical sensor device, sensor data associated with a plurality of light beams that were distributed in an encoded pattern on an input surface of an optical filter of the optical sensor device by a phase mask of the optical sensor device (block 710). For example, the optical sensor device may obtain, from an optical sensor of the optical sensor device, sensor data associated with a plurality of light beams that were distributed in an encoded pattern on an input surface of an optical filter of the optical sensor device by a phase mask of the optical sensor device, as described above.

As further shown in FIG. 7, process 700 may include identifying, based on the sensor data, a channel, of one or more channels of the optical filter, that received and passed a light beam (block 720). For example, the optical sensor device may identify, based on the sensor data, a channel, of one or more channels of the optical filter, that received and passed a light beam, as described above.

As further shown in FIG. 7, process 700 may include identifying, based on the sensor data, a sensor element of the optical sensor that received the light beam (block 730). For example, the optical sensor device may identify, based on the sensor data, a sensor element of the optical sensor that received the light beam, as described above.

As further shown in FIG. 7, process 700 may include determining, based on information associated with the encoded pattern and identifying the channel and the sensor element, an angle of incidence of the light beam on the channel (block 740). For example, the optical sensor device may determine, based on information associated with the encoded pattern and identifying the channel and the sensor element, an angle of incidence of the light beam on the channel, as described above.

As further shown in FIG. 7, process 700 may include determining, based on the angle of incidence of the light beam and angle shift information associated with the channel, a wavelength range associated with the light beam (block 750). For example, the optical sensor device may determine, based on the angle of incidence of the light beam and angle shift information associated with the channel, a wavelength range associated with the light beam, as described above.

As further shown in FIG. 7, process 700 may include providing information identifying the wavelength range associated with the light beam (block 760). For example, the optical sensor device may provide information identifying the wavelength range associated with the light beam, as described above.

Process 700 may include additional implementations, such as any single implementation or any combination of implementations described below and/or in connection with one or more other processes described elsewhere herein.

In a first implementation, the light beam is associated with a point of a subject, and process 700 further comprises identifying, based on the sensor data, an additional channel, of the one or more channels, of the optical filter that received and passed an additional light beam associated with the point of the subject; identifying, based on the sensor data, an additional sensor element of the optical sensor that received the additional light beam; determining, based on the information associated with the encoded pattern and identifying the additional channel and the additional sensor element, an angle of incidence of the additional light beam on the additional channel; determining, based on the angle of incidence of the light beam and the angle of incidence of the additional light beam, a distance of the point of the subject from the optical sensor device; and providing information identifying the distance of the point of the subject from the optical sensor device.

In a second implementation, providing the information identifying the distance of the point of the subject from the optical sensor device comprises sending the information identifying the distance of the point of the subject from the optical sensor device to another device to cause the other device to determine one or more characteristics of the subject.

In a third implementation, determining the angle of incidence of the light beam on the channel comprises identifying, based on the information associated with the encoded pattern and information identifying the channel, an angle of incidence range of the light beam, and determining, based on the angle of incidence range of the light beam and information identifying the sensor element, the angle of incidence of the light beam.

In a fourth implementation, the angle shift information associated with the channel indicates a first wavelength range for light beams that are received and passed by the channel and that fall incident on the channel at angles that satisfy an incident angle threshold, and a second wavelength range for light beams that are received and passed by the channel and that fall incident on the channel at angles that do not satisfy the incident angle threshold.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical sensor device, comprising:
   an optical sensor comprising a set of sensor elements;
   an optical filter with an angle-dependent wavelength characteristic comprising one or more channels,
      wherein each channel, of the one or more channels, is configured to pass light associated with particular wavelengths to a subset of sensor elements, of the set of sensor elements, of the optical sensor based on an angle of incidence of the light on the channel;

a phase mask configured to distribute a plurality of light beams associated with a subject in an encoded pattern on an input surface of the optical filter; and one or more processors configured to:
- obtain, from the optical sensor, sensor data associated with the subject;
- determine, based on the sensor data, spectral information associated with the subject;
- determine, based on the sensor data and information associated with the encoded pattern, spatial information associated with the subject; and
- perform one or more actions based on the spectral information and the spatial information.

2. The optical sensor device of claim 1, wherein the phase mask is disposed on a first surface of a substrate and the optical filter is disposed on a second surface of the substrate to form a combined optical element,
wherein the combined optical element is disposed over the optical sensor.

3. The optical sensor device of claim 2, wherein a thickness of the substrate is configured to cause the phase mask to distribute the plurality of light beams in the encoded pattern across the input surface of the optical filter.

4. The optical sensor device of claim 1, wherein the information associated with the encoded pattern includes, for a light beam, of the plurality of light beams, that is distributed by the phase mask in the encoded pattern:
information for determining, when the light beam falls incident on a particular channel, of the one or more channels, of the optical filter, an angle of incidence of the light beam on the particular channel.

5. The optical sensor device of claim 1, wherein the one or more processors are configured to, when determining the spatial information:
- identify, based on the sensor data, a first channel, of the one or more channels, of the optical filter that received and passed a first light beam associated with a point of the subject;
- identify, based on the sensor data, a second channel, of the one or more channels, of the optical filter that received and passed a second light beam associated with the point of the subject;
- determine, based on the information associated with the encoded pattern and identifying the first channel, an angle of incidence of the first light beam on the first channel;
- determine, based on the information associated with the encoded pattern and identifying the second channel, an angle of incidence of the second light beam on the second channel; and
- determine, based on the angle of incidence of the first light beam and the angle of incidence of the second light beam, a distance of the point of the subject from the optical sensor device.

6. The optical sensor device of claim 1, wherein the one or more processors are configured to, when determining the spatial information:
- identify, based on the sensor data, a first channel, of the one or more channels, of the optical filter that received and passed a first light beam associated with a point of the subject, and a first sensor element, of a first subset of sensor elements that corresponds to the first channel, of the optical sensor that received the first light beam;
- identify, based on the sensor data, a second channel, of the one or more channels, of the optical filter that received and passed a second light beam associated with the point of the subject, and a second sensor element, of a second subset of sensor elements that corresponds to the second channel, of the optical sensor that received the second light beam;
- determine, based on the information associated with the encoded pattern and identifying the first channel and the first sensor element, an angle of incidence of the first light beam on the first channel;
- determine, based on the information associated with the encoded pattern and identifying the second channel and the second sensor element, an angle of incidence of the second light beam on the second channel; and
- determine, based on the angle of incidence of the first light beam and the angle of incidence of the second light beam, a distance of the point of the subject from the optical sensor device.

7. The optical sensor device of claim 1, wherein the one or more processors are configured to, when determining the spectral information:
- identify, based on the sensor data, a particular channel, of the one or more channels, of the optical filter that received and passed a light beam associated with a point of the subject;
- determine, based on the information associated with the encoded pattern and identifying the particular channel, an angle of incidence of the light beam on the particular channel; and
- determine, based on the angle of incidence of the light beam and angle shift information associated with the particular channel, a wavelength range associated with the light beam.

8. The optical sensor device of claim 7, wherein the angle shift information associated with the particular channel indicates:
- a first wavelength range for light beams that are received and passed by the particular channel and that fall incident on the particular channel at angles that satisfy an incident angle threshold; and
- a second wavelength range for light beams that are received and passed by the particular channel and that fall incident on the particular channel at angles that do not satisfy the incident angle threshold.

9. The optical sensor device of claim 1, wherein the one or more processors are configured to, when determining the spectral information:
- identify, based on the sensor data, a particular channel, of the one or more channels, of the optical filter that received and passed a light beam associated with a point of the subject, and a particular sensor element, of a particular subset of sensor elements that corresponds to the particular channel, of the optical sensor that received the light beam;
- determine, based on the information associated with the encoded pattern and identifying the particular channel and the particular sensor element, an angle of incidence of the light beam on the particular channel; and
- determine, based on the angle of incidence of the light beam and angle shift information associated with the particular channel, a wavelength range associated with the light beam.

10. The optical sensor device of claim 1, wherein the one or more processors are configured to, when performing the one or more actions:
cause display of the spectral information and the spatial information on a display of another device.

11. A non-transitory computer-readable medium storing instructions, the instructions comprising:

one or more instructions that, when executed by one or more processors of an optical sensor device, cause the one or more processors to:
  obtain, from an optical sensor of the optical sensor device, sensor data associated with a plurality of light beams that were distributed in an encoded pattern on an input surface of an optical filter of the optical sensor device by a phase mask of the optical sensor device;
  identify, based on the sensor data, a channel, of one or more channels of the optical filter, that received and passed a light beam;
  determine, based on information associated with the encoded pattern and identifying the channel, an angle of incidence of the light beam on the channel;
  determine, based on the angle of incidence of the light beam and angle shift information associated with the channel, a wavelength range associated with the light beam; and
  provide information identifying the wavelength range associated with the light beam.

12. The non-transitory computer-readable medium of claim 11, wherein the one or more instructions, that cause the optical sensor device to provide the information identifying the wavelength range associated with the light beam, cause the optical sensor device to:
  send the information identifying the wavelength range associated with the light beam to another device to cause the other device to determine one or more characteristics of a subject associated with the light beam.

13. The non-transitory computer-readable medium of claim 11, wherein the light beam is associated with a point of a subject, and
  wherein the one or more instructions, when executed by the one or more processors, further cause the optical sensor device to:
    identify, based on the sensor data, an additional channel, of the one or more channels, of the optical filter that received and passed an additional light beam associated with the point of the subject;
    determine, based on the information associated with the encoded pattern and identifying the additional channel, an angle of incidence of the additional light beam on the additional channel;
    determine, based on the angle of incidence of the light beam and the angle of incidence of the additional light beam, a distance of the point of the subject from the optical sensor device; and
    provide information identifying the distance of the point of the subject from the optical sensor device.

14. The non-transitory computer-readable medium of claim 11, wherein the one or more instructions, that cause the optical sensor device to determine the angle of incidence of the light beam on the channel, cause the optical sensor device to:
  identify, based on the information associated with the encoded pattern, an algorithm for reconstructing an image from the encoded pattern; and
  determine, using the algorithm and based on information identifying the channel, the angle of incidence of the light beam.

15. The non-transitory computer-readable medium of claim 11, wherein the angle shift information associated with the channel indicates:
  a first wavelength range for light beams that are received and passed by the channel and that fall incident on the channel at angles that satisfy an incident angle threshold; and
  a second wavelength range for light beams that are received and passed by the channel and that fall incident on the channel at angles that do not satisfy the incident angle threshold.

16. A method, comprising:
  obtaining, by an optical sensor device and from an optical sensor of the optical sensor device, sensor data associated with a plurality of light beams that were distributed in an encoded pattern on an input surface of an optical filter of the optical sensor device by a phase mask of the optical sensor device;
  identifying, by the optical sensor device and based on the sensor data, a channel, of one or more channels of the optical filter, that received and passed a light beam;
  identifying, by the optical sensor device and based on the sensor data, a sensor element of the optical sensor that received the light beam;
  determining, by the optical sensor device and based on information associated with the encoded pattern and identifying the channel and the sensor element, an angle of incidence of the light beam on the channel;
  determining, by the optical sensor device and based on the angle of incidence of the light beam and angle shift information associated with the channel, a wavelength range associated with the light beam; and
  providing, by the optical sensor device, information identifying the wavelength range associated with the light beam.

17. The method of claim 16, wherein the light beam is associated with a point of a subject, wherein the method further comprises:
  identifying, based on the sensor data, an additional channel, of the one or more channels, of the optical filter that received and passed an additional light beam associated with the point of the subject;
  identifying, based on the sensor data, an additional sensor element of the optical sensor that received the additional light beam;
  determining, based on the information associated with the encoded pattern and identifying the additional channel and the additional sensor element, an angle of incidence of the additional light beam on the additional channel;
  determine, based on the angle of incidence of the light beam and the angle of incidence of the additional light beam, a distance of the point of the subject from the optical sensor device; and
  provide information identifying the distance of the point of the subject from the optical sensor device.

18. The method of claim 17, wherein providing the information identifying the distance of the point of the subject from the optical sensor device comprises:
  sending the information identifying the distance of the point of the subject from the optical sensor device to another device to cause the other device to determine one or more characteristics of the subject.

19. The method of claim 16, wherein determining the angle of incidence of the light beam on the channel comprises:
  identifying, based on the information associated with the encoded pattern and information identifying the channel, an angle of incidence range of the light beam; and determine, based on the angle of incidence range of the light beam and information identifying the sensor element, the angle of incidence of the light beam.

20. The method of claim 16, wherein the angle shift information associated with the channel indicates:
- a first wavelength range for light beams that are received and passed by the channel and that fall incident on the channel at angles that satisfy an incident angle threshold; and
- a second wavelength range for light beams that are received and passed by the channel and that fall incident on the channel at angles that do not satisfy the incident angle threshold.

* * * * *